Aug. 31, 1926.
J. A. MURPHEY
1,598,494
TILTABLE STEERING WHEEL
Filed August 5, 1921    5 Sheets-Sheet 4
FIG. VI.
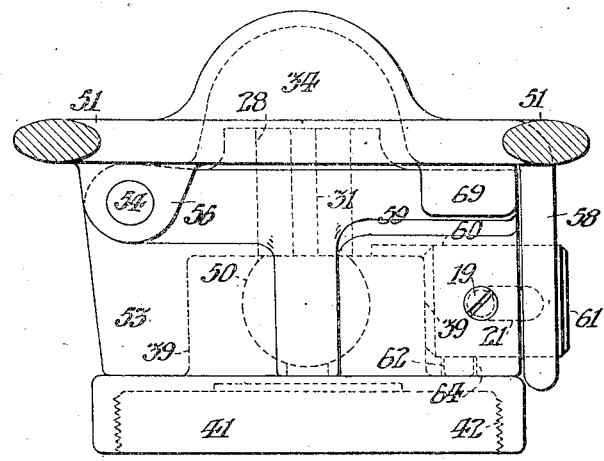
FIG. VII.
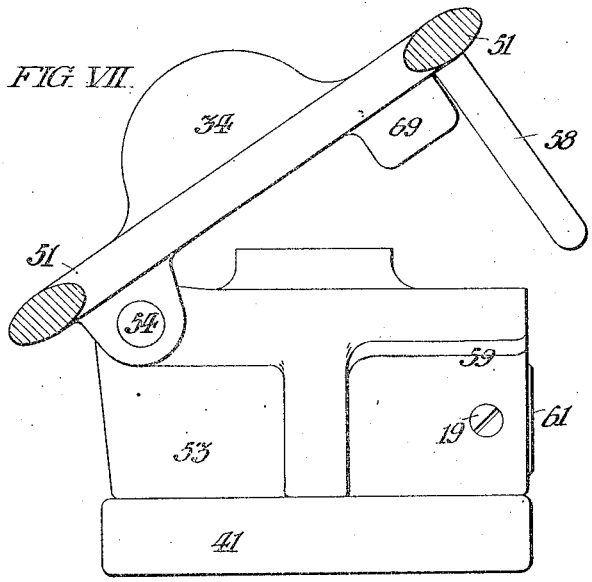
INVENTOR:
JAMES A. MURPHEY, Aug. 31, 1926.
J. A. MURPHEY
1,598,494
TILTABLE STEERING WHEEL
Filed August 5, 1921      5 Sheets-Sheet 5
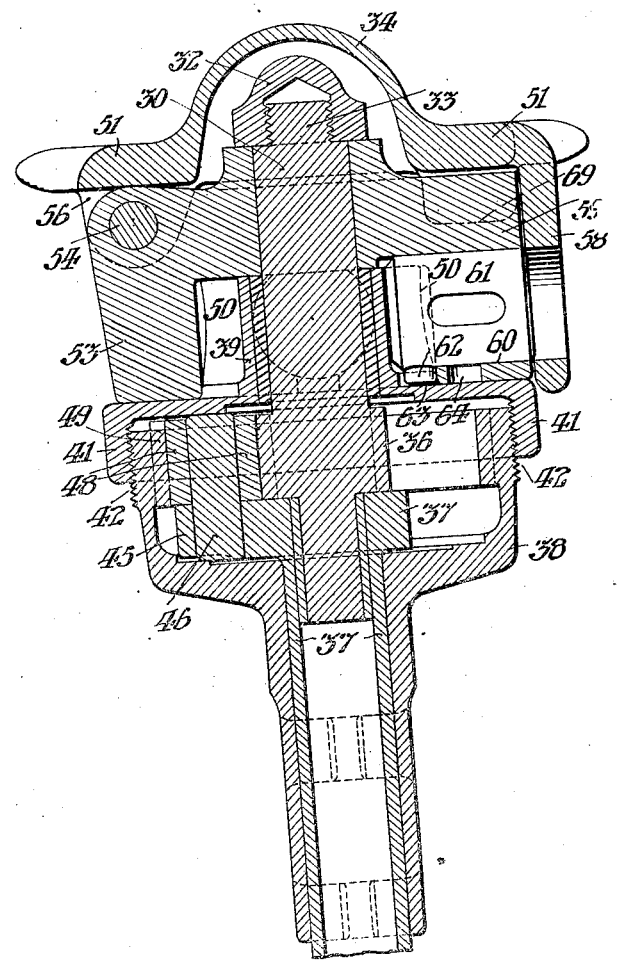
FIG. VIII.
INVENTOR:
JAMES A. MURPHEY, Patented Aug. 31, 1926.

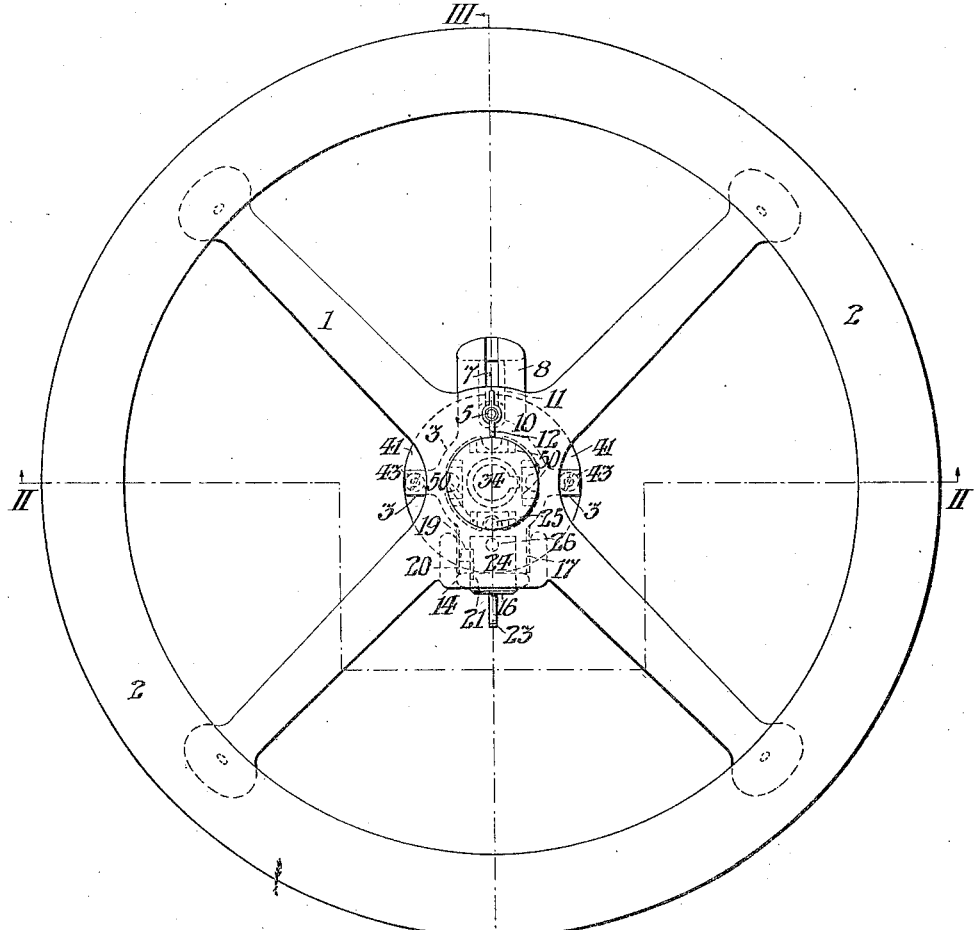

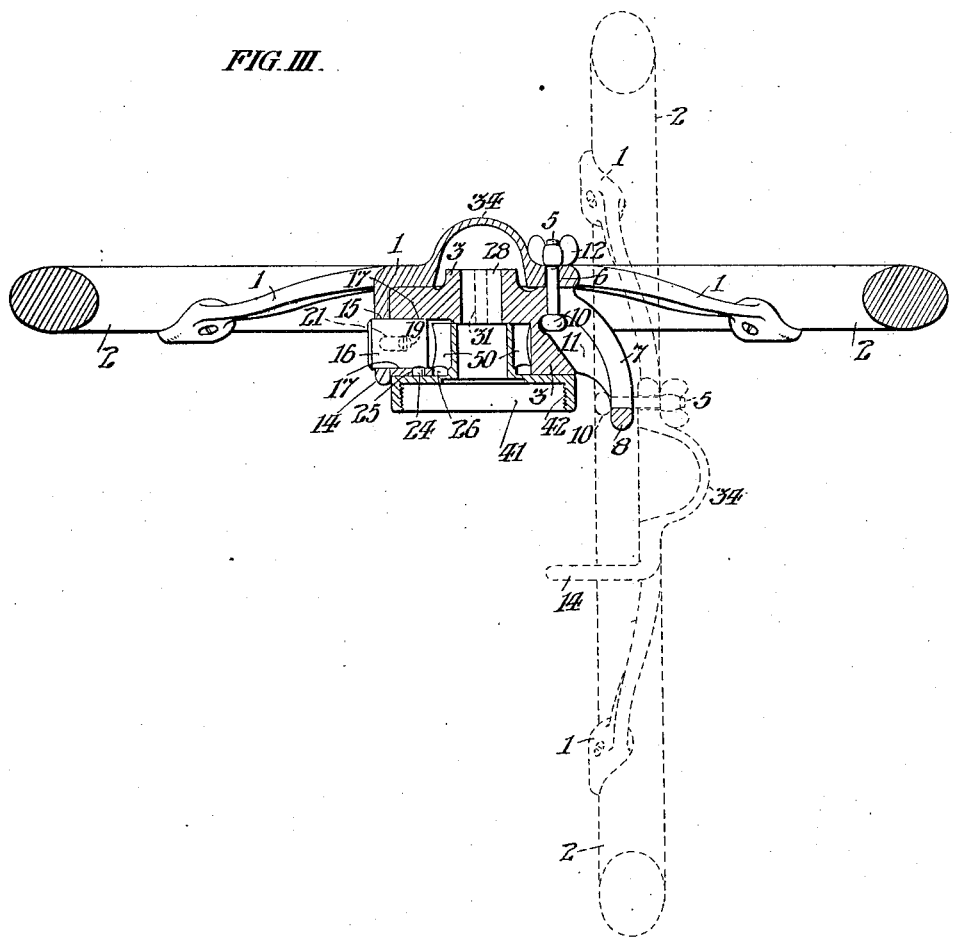

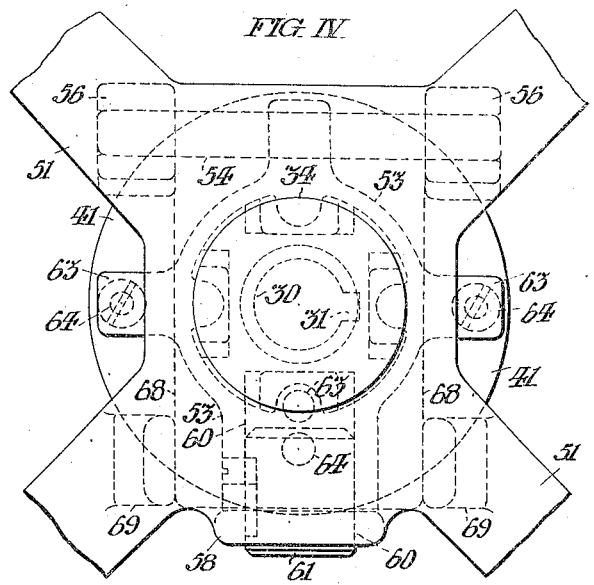
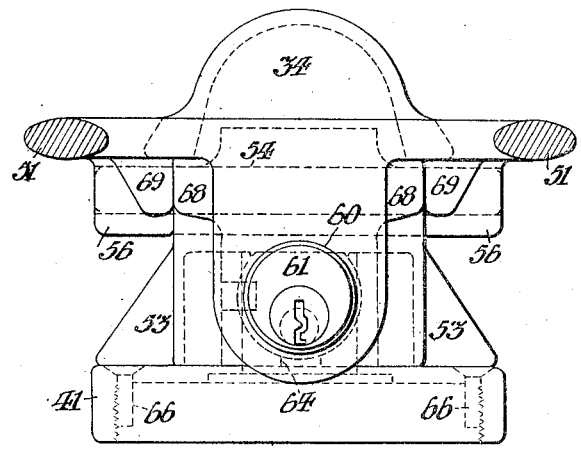

1,598,494

UNITED STATES PATENT OFFICE.

JAMES A. MURPHEY, OF GERMANTOWN, PENNSYLVANIA.

TILTABLE STEERING WHEEL.

Application filed August 5, 1921. Serial No. 490,098.

My invention relates to an automobile steering wheel capable of being tilted with respect to the steering shaft upon which it is mounted, so as to facilitate the ingress and egress of the operator with respect to the chauffeur's seat. It is characteristic of the form of my invention hereinafter described; that said wheel is hingedly connected with its hub and the latter provided with locking means, and movement of said locking means to permit the wheel to be steered causes said locking means to lock the wheel so that it cannot be tilted, and movement of said locking means to free the wheel so that it may be tilted locks the steering shaft so that the vehicle cannot be steered. The advantages of that arrangement are that the chauffeur cannot tilt the wheel to get out until he has locked said wheel so that it will not be turned.

As hereinafter described, the locking means are adapted for detachably rigidly connecting the steering shaft with the bearing tube inclosing said shaft, so as to prevent the vehicle from being steered; and preferably so constructed and arranged that the front wheels of the vehicle may be turned at right angles to their normal position, against a curb or similar obstruction before thus locking the vehicle, to prevent the latter from being towed. Such locking means includes a lock body, preferably of a "pin" key type, which may be permanently retained in connection with the vehicle, but alternately in two positions, in both of which it is locked, but in only one of which it locks the vehicle; in the other position, it merely locks the wheel against tilting movement upon its shaft.

My present invention is of the general class claimed in my Letters Patent of the United States No. 1,156,615 dated October 12, 1915; No. 1,336,206 dated January 18, 1921 and No. 1,367,200 dated February 1, 1921, wherein the locking means are rotatable with the steering wheel.

I have found it convenient to illustrate my invention with reference to an embodiment thereof in conjunction with a steering wheel and its appurtenances, of the present "Ford" type, and to adapt the locking means to detachably engage the cover of the internal gear case which is a stationary fixture at the top of the steering column. Such covers are screw threaded and, ordinarily, are removable at any time by merely rotating them. However, the form of my invention hereinafter described includes detent screw means which prevent the removal of said cover when the device is locked to prevent steering; so that said device is not only capable of preventing the vehicle from being steered but also prevents removal of said cover, when locked.

The form of my invention hereinafter described is designed to be sold as an accessory, comprising a complete steering wheel and internal gear case cover, adapted to be substituted for the automobile steering wheel and internal gear case cover of an ordinary automobile of the "Ford" type. However, my invention includes the various novel features of construction and arrangement hereinafter more definitely specified.

In said drawings; Fig. I is a plan view of an automobile steering wheel, conveniently embodying my invention.

Fig. II is a vertical sectional view of said wheel and its appurtenances, taken on the line II, II in Fig. I.

Fig. III is a vertical sectional view of said wheel and its appurtenances taken on the line III, III in Figs. I and II showing the normal position of said wheel in full lines and the idle position thereof in dash lines.

Fig. IV is a fragmentary plan view of a steering wheel and its appurtenances embodying a modified form of my invention; said wheel being locked so that it cannot be tilted but so that it can be steered.

Fig. V is a front elevation of the structure shown in Fig. IV.

Fig. VI is a left hand side elevation of said structure shown in Figs. IV and V.

Fig. VII is a side elevation of the structure shown in Fig. VI but with the locking means shifted so that said wheel can be tilted but cannot be used to steer the vehicle.

Fig. VIII is a vertical sectional view similar to Fig. III but including the gear case and contents of the Ford type.

Referring to the form of my invention shown in Figs. I, II and III; the steering wheel comprises the spider frame 1 of cast metal provided with the wooden rim 2. Said spider frame is normally rigidly connected with the hub casting 3 by the pivot bolt 5 which extends through the bolt hole 6 in said spider frame and the slot 7 in the bracket 8 which is in unitary relation with said hub casting 3: said bolt 5 having its head 10 fitted to slide freely, without turning, in the pocket 11 of said hub adjoining said slot 7. Said bolt is provided with the wing nut 12 arranged to normally rigidly hold it in the position shown in Fig. III. In that position, the hasp 14 extends downwardly over said hub casting 3 at the front thereof normally presented to the operator; the lock opening 15 in said hasp being engaged by the lock body 16 which is mounted to reciprocate in the lock socket 17 in said hub and is prevented from turning therein by the set screw 19 which extends through the side of the lock casing 20, as indicated in Fig. I, into engagement with the slot 21 in the side of said lock body 16, as indicated in dotted lines in Fig. III. Said lock, which is conveniently of the pin tumbler type is arranged to be controlled by the key 23 which operates the locking bolt 24 which is arranged to be projected and retracted transversely to the axis of said lock socket 17 in said hub 3. Said locking bolt 24 is adapted to selectively engage the locking bolt recesses 25 and 26 in said lock casing 20, which is in unitary relation with said hub 3 as shown.

It is to be understood that the construction and arrangement above described is such that said steering wheel, including the spider frame 1 and its rim 2, is normally retained in concentric relation with the shaft hole 28 in said hub 3, but is released and free to be pivoted on said clamping bolt 5 when said lock body is thrust inwardly; so that said wheel may be swung out of the way when thus released. That is to say; by loosening said wing nut 12, and unlocking said lock body 16, by retracting its locking bolt 24 from the locking bolt recess 25, and thrusting said lock body 16 inwardly and securing it by projecting said locking bolt into the locking bolt recess 26; said wheel is released so that it may be tilted upwardly at the front, to wit, the edge thereof presented to the operator, until said hasp 14 is above said hub 3. Said wheel may then be pushed away from the operator, with its clamping pivot bolt 5 following down said slot 7 in the bracket 8, until the axis of said clamping bolt is at right angles to the axis of said hub 3, as indicated in Fig. III, wherein said wheel is shown in dash lines not only thus tilted but also turned on said pivot bolt 5 so as to present upwardly, in such idle position, that portion of the steering wheel which is normally most remote from the operator. It may be observed that such turning movement of said steering wheel causes it to project upwardly from said bolt 5, to a less extent than if allowed to remain unturned after it is tilted.

The form of my invention above described with reference to Figs. I, II and III is adapted to be sold as an automobile accessory, substitute for the original steering wheel of a "Ford" car. As shown in Fig. VIII such a car is provided with the drive pinion shaft 30 having a key 31 for engagement with the wheel hub 3, so that said shaft may be turned by said wheel. Accidental displacement of said wheel hub from said shaft is prevented by the cap nut 32 which engages the screw thread 33 at the top of said shaft. The dome 34 at the center of said spider frame 1 normally covers said cap nut, as shown in Fig. VIII. Said shaft 30 has, in unitary relation therewith, the pinion 36, and its lower end is journaled in the drive pinion shaft bushing 37 which is rotatable in the internal gear case 38, which is normally stationary in the automobile. Said shaft 30 is also journaled in the sleeve flange 39 on the gear case cover 41. Although said cover 41 is adapted to be connected with said case 38 by the screw thread 42, its rotation and disengagement are normally prevented by the two screws 43 which extend through said cover 41 into threaded engagement with said case 38. Said drive pinion shaft bushing 37 has, at its upper end, three arms 45 carrying respective stud shafts 46 parallel with said shaft 30. The planetary pinions 48 are mounted upon said stud shafts 46, in mesh with said pinion 36 and in mesh with the internal gear 49, which latter is formed in unitary relation with said case 38.

Said sleeve 39, which is thus held stationary in the vehicle and upon which said hub 3 is journaled, has a circumferential series of lock recesses 50 which may be selectively engaged by said lock body 16; so that, when said lock body is thrust inwardly, as above described, to release the steering wheel, comprising said spider frame 1 and rim 2, so that they may be tilted, said hub is locked in connection with said stationary gear casing 38 so that said hub cannot be turned and, consequently, the vehicle cannot be steered, until said lock body 16 is withdrawn from the recesses 50, into position to engage said hasp 14, as above described.

Although I prefer to embody my invention in a steering wheel having the capacity to tilt and turn upon the clamping bolt 5 as above described; essential features of my invention may be embodied in a simpler form of structure; for instance, such as I have shown in Figs. IV to VIII inclusive.

In the form of my invention shown in Figs. IV to VIII inclusive, the wheel spider 51, which is part of a steering wheel such as above described, provided with a rim such as the rim 2, is pivotally connected with the primarily separate hub 53, by the pivot 54 having its axis transverse to the axis of said shaft 30. I find it convenient to drive said pivot 54 tightly in said hub 53 and to provide said spider 51 with lugs 56, in the spaced relation shown in Fig. IV, to receive the ends of said pivot and tilt thereon. Said spider 51 has the hasp 58 normally overhanging the lock casing 59, which is in unitary relation with said hub 53 and provided with the socket 60 for the lock 61 having the transversely extending locking bolt 62 which is adapted to alternately engage the locking bolt recesses 63 and 64 to respectively hold the said lock body 61 in the position shown in Fig. VIII and in the position shown in Fig. IV. It may be observed that when said hub 53 is locked in the position shown in Fig. VIII, and thus prevented from turning, it not only prevents the steering shaft 30 from being turned to steer the vehicle but also covers, with its lateral flanges 63, the screw holes 64 and the screws 66 which are fitted therein for engagement with the internal gear casing 38; which screws are indicated in dotted lines in Figs. IV and V.

In the form of my invention shown in Figs. I to III inclusive; the hasp 14 has wing flanges which extend, continuously therewith, upon opposite sides of the lock casing in said hub 3. However, in the form of my invention shown in Figs. IV to VIII inclusive I find it convenient to provide the lock casing 59, which is in unitary relation with the hub 53, with lateral lugs 68 to bear against respective wing flanges 69 on said spider 51; said wing flanges 69 being in spaced relation with said hasp 58 so as to facilitate the machining of the bearing surfaces of said flanges 69 by means of a pair of coupled milling cutters.

Although I prefer to provide a stationary bearing, such as the sleeve 39, with a series of lock recesses such as indicated at 50 in its perimeter, to be selectively engaged by the locking means described, of course, said locking means only engages one of such recesses when the structure is locked against steering movement. Therefore, it is unnecessary to provide more than one such recess, unless it is desired to lock the steering mechanism of the vehicle with the front wheels thereof in selectively different positions. However, the capacity to thus lock the wheels is desirable for they may be thus turned either to the right or to the left against the street curb, to prevent the vehicle thus locked from being towed. As far as I am aware, it is broadly new to provide a steering wheel which may be turned, relatively to its hub, to shift the wheel from operative concentric relation with its hub to inoperative eccentric relation with its hub in the manner exemplified with reference to Figs. I, II and III. Moreover I believe it to be broadly new to provide a tiltable steering wheel with locking means arranged to alternately lock the wheel against operative movement of the steering mechanism when the wheel is free to tilt, and lock the wheel against tilting movement when it is free for steering movement. The advantage of the latter feature of my invention is that the operator is compelled to lock the steering mechanism in inoperative position in order to free the steering wheel to facilitate his egress and ingress with respect to the chauffeur's seat.

Therefore I do not desire to limit myself to the precise details of construction and arrangement herein set forth, as it is obvious that various modifications may be made therein without departing from the essential features of my invention, as defined in the appended claims.

I claim:

1. The combination with a stationary gear case; of a cover for said gear case; a steering shaft journaled in said case and cover; a sleeve flange on said cover having in its perimeter a circumferential series of lock recesses; a wheel hub keyed on said steering shaft and fitted to turn on said sleeve flange, having a lock casing with a cylindrical socket adapted to selectively register with said lock recesses, and having a locking bolt recess with its axis transverse to the axis of said socket; a key lock, having a cylindrical body fitted to reciprocate in said lock socket and to be thrust into said recesses, having a locking bolt, arranged to be projected and withdrawn by a key, to engage and disengage said locking bolt recess; whereby said wheel hub and said shaft may be locked against rotation and freed for rotation, in accordance with the position of said lock body; said wheel hub having, diametrically opposite to said lock casing, a downwardly curved bracket with an undercut slot in a plane radial to the axis of said shaft; a clamping bolt extending through said slot and having a head engaged in the undercut portion of said bracket, whereby said bolt is prevented from turning; a nut on said bolt; a steering wheel normally carried by said hub, in concentric relation with said shaft, and including a spider having a clamping bolt hole in eccentric relation to the axis of said spider and pivotally engaging said clamping bolt; said spider having a pendent hasp flange diametrically opposite to said clamping bolt hole; said hasp flange having a radial opening arranged to register with the cylindrical socket in said hub and to receive said lock body when the latter is withdrawn from engagement in the lock recess of said sleeve; whereby said wheel is normally retained in concentric relation with said shaft by said lock body, but released and free to be pivoted on said clamping bolt when said lock body is engaged with said sleeve; so that said wheel may be swung out of the way when thus released.

2. The combination with a stationary gear case; of a cover for said gear case; a steering shaft journaled in said case and cover; a sleeve flange on said cover having in its perimeter a circumferential lock recess; a wheel hub carried by said steering shaft and fitted to turn on said sleeve flange, having a lock casing with a socket adapted to register with said lock recess, and having a locking bolt recess with its axis transverse to the axis of said socket; a key lock, having a body fitted to reciprocate in said lock socket and to be thrust into said recess, having a locking bolt, arranged to be operated by a key, to engage and disengage said locking bolt recess; whereby said wheel hub and said shaft may be locked against rotation and freed for rotation, in accordance with the position of said lock body; said wheel hub having a downwardly curved bracket with a slot in a plane radial to the axis of said shaft; a clamping bolt extending in said slot and having a head engaged in said bracket, whereby said bolt is prevented from turning; a nut on said bolt; a steering wheel normally carried by said hub, in concentric relation with said shaft, and including a spider having a clamping bolt hole in eccentric relation to the axis of said spider and pivotally engaging said clamping bolt; said spider having a pendent hasp flange with a radial opening arranged to register with said socket in said hub and to receive said lock body when the latter is withdrawn from engagement in the lock recess of said sleeve; whereby said wheel is normally retained in concentric relation with said shaft by said lock body, but released and free to be pivoted on said clamping bolt when said lock body is engaged with said sleeve; so that said wheel may be swung out of the way when thus released.

3. The combination with a stationary gear case; of a cover for said gear case; a steering shaft journaled in said case and cover; a sleeve flange on said cover having in its perimeter a lock recess; a wheel hub carried by said steering shaft and fitted to turn on said sleeve flange, having a lock casing with a socket adapted to register with said lock recess; a key lock, having a body fitted to reciprocate in said lock socket and to be thrust into said recess, arranged to be operated by a key; whereby said wheel hub and said shaft may be locked against rotation and freed for rotation, in accordance with the position of said lock body; said wheel hub having a downwardly curved bracket with a slot in a plane radial to the axis of said shaft; a clamping bolt extending in said slot and engaged in said bracket; a steering wheel normally carried by said hub, in concentric relation with said shaft, and including a spider having a clamping bolt hole in eccentric relation to the axis of said spider and pivotally engaging said clamping bolt; said spider having a pendent hasp flange with a radial opening arranged to register with said socket in said hub and to receive said lock body when the latter is withdrawn from engagement in the lock recess of said sleeve; whereby said wheel is normally retained in concentric relation with said shaft by said lock body, but released and free to be pivoted on said clamping bolt when said lock body is engaged with said sleeve; so that said wheel may be swung out of the way when thus released.

4. An automobile steering wheel having a separable hub; a clamping bolt connecting said wheel and hub; said clamping bolt being fitted in a slot in said hub for movement in a radial plane from a position parallel with the axis of said wheel to a position at right angles thereto; whereby said wheel may be pivotally tilted with respect to said hub, from operative to inoperative position; a hasp on said wheel, arranged to normally overhang said hub; a lock socket in said hub; a lock body fitted to reciprocate in said hub socket, to and from engagement with said hasp; an axial bearing for said hub, including a normally stationary sleeve having a recess in its perimeter arranged to receive the inner end of said lock body; and a key fitted to said lock; whereby said lock may be drawn outwardly to secure said wheel in connection with said hub, by engagement with said hasp, and be thrust inwardly to disengage said hasp and engage said sleeve; so that movement of said lock to position to prevent rotation of said hub on said sleeve frees said wheel to be tilted out of the way, and reverse movement of said lock to free said hub for rotation engages said hasp and prevents said wheel from being tilted.

5. An automobile steering wheel having a separable hub; a clamping bolt connecting said wheel and hub; said clamping bolt being fitted in said hub; whereby said wheel may be pivotally tilted with respect to said hub, from operative to inoperative position; a hasp on said wheel, arranged to normally overhang said hub; a lock socket in said hub; a lock body fitted to reciprocate in said hub socket to and from engagement with said hasp; an axial bearing for said hub, including a normally stationary sleeve having a recess in its perimeter arranged to receive the inner end of said lock body; and a key fitted to said lock; whereby said lock may be turned outwardly to secure said wheel in connection with said hub, by engagement with said hasp, and be thrust inwardly to disengage said hasp and engage said sleeve; so that movement of said lock to position to prevent rotation of said hub on said sleeve frees said wheel to be tilted out of the way and reverse movement of said lock to free said hub for rotation engages said hasp and prevents said wheel from being tilted.

6. An automobile steering wheel having a separable hub; a pivot connecting said wheel and hub; whereby said wheel may be pivotally tilted with respect to said hub, from operative to inoperative position; a hasp on said wheel, arranged to normally overhang said hub; a lock socket in said hub; a lock body fitted to reciprocate in said hub socket, to and from engagement with said hasp; an axial bearing for said hub, including a normally stationary sleeve having a recess in its perimeter arranged to receive the inner end of said lock body; and a key fitted to said lock; whereby said lock may be drawn outwardly to secure said wheel in connection with said hub, by engagement with said hasp, and be thrust inwardly to disengage said hasp and engage said sleeve; so that movement of said lock to position to prevent rotation of said hub on said sleeve frees said wheel to be tilted out of the way, and reverse movement of said lock to free said hub for rotation engages said hasp and prevents said wheel from being tilted.

7. An automobile steering wheel having a separable hub; a pivot connecting said wheel and hub; whereby said wheel may be pivotally tilted with respect to said hub, from operative to inoperative position; a hasp on said wheel, arranged to normally overhang said hub; a lock socket in said hub; a lock body fitted to reciprocate in said hub socket, to and from engagement with said hasp; an axial bearing for said hub, having a recess arranged to receive the end of said lock body; and a key arranged to operate said lock; whereby said lock may be shifted in one direction to secure said wheel in connection with said hub, by engagement with said hasp, and be shifted in the opposite direction to disengage said hasp and engage said axial bearing; so that movement of said lock to position to prevent rotation of said hub on said bearing frees said wheel to be tilted out of the way, and reverse movement of said lock to free said hub for rotation engages said hasp and prevents said wheel from being tilted.

8. An automobile steering wheel having a separable hub; a clamping bolt pivotally connecting said wheel and hub; said clamping bolt being fitted in a slot in said hub for movement in a radial plane from position parallel with the axis of said wheel to a position at right angles thereto; whereby said wheel may be pivotally tilted with respect to said hub, from operative to inoperative position; a hasp on said wheel, arranged to normally overhang said hub; a lock socket in said hub; a lock body fitted to reciprocate radially in said socket to and from engagement with said hasp; and a key fitted to said lock; whereby said lock may be drawn outwardly to secure said wheel in connection with said hub, by engagement with said hasp, and be thrust inwardly to disengage said hasp.

9. An automobile steering wheel having a separable hub; a pivot connecting said wheel and hub; whereby said wheel may be pivotally tilted with respect to said hub, from operative to inoperative position; a hasp on said wheel, arranged to normally overhang said hub; a lock socket in said hub; a lock body fitted to reciprocate in said socket to and from engagement with said hasp; and a key fitted to said lock; whereby said lock may be drawn outwardly to secure said wheel in connection with said hub, by engagement with said hasp, and be thrust inwardly to disengage said hasp.

10. An automobile steering wheel having a hub; a pivot connecting said wheel and hub; whereby said wheel may be pivotally tilted with respect to said hub, from operative to inoperative position; a hasp on said wheel; a lock carried by said hub, arranged to engage said hasp; and a key for said lock; whereby said lock may be operated to secure said wheel in connection with said hub, by engagement with said hasp.

In testimony whereof, I have hereunto signed my name at Philadelphia, Pennsylvania, this 30th day of July, 1921.

JAMES A. MURPHEY.